Patented Nov. 14, 1944

2,362,772

UNITED STATES PATENT OFFICE 2,362,772

POWDER METALLURGICAL METHODS

Ivar Rennerfelt, Djursholm, Sweden

No Drawing. Application January 2, 1942, Serial No. 425,453. In Sweden September 25, 1940

4 Claims. (Cl. 75—28)

Solid objects of iron and other metals are now often being made by very finely pulverizing the metals and then forming the powder or powders by means of a very high pressure to objects of any desired shape. The high pressure forming may take place under a simultaneous, preceding or following heating to sintering temperature without melting of the powder or the objects, which may consist of one or more finely subdivided metals or alloys, intimately mixed with each other. When working iron or nickel according to powder metallurgical methods it is customary to use very fine powder made from the carbonyls of the metals but one may also use electrolytic iron and nickel, which may be obtained in rather brittle, easily crushed form. It is possible also to use pulverized iron, that has been made by reducing an ore with hydrogen gas.

A very suitable and cheap raw material is obtained by using iron grains produced by disintegrating liquid, carbon holding iron, for instance pig iron, and cooling the more or less fine grained product in a cooling means such as air, steam or water, whereafter it is decarburized in any known manner without melting and substantially without any undesirable oxidizing of the surface of the grains. If the disintegration is so performed that very small grains or granules, for example with the maximum dimension below about 1 millimeter, are produced, which are decarburized to below for example 0.25 to 0.10%, it becomes possible to grind or otherwise subdivide the particles without difficulties and at low costs to very fine, dustlike powders in a suitable disintegrator, for instance by using a milling apparatus consisting of plane, parallel discs of a hard special alloy, provided with fine grinding rifles or teeth, which are rotated against each other, one of the discs possibly being stationary. It is clear that such pulverizing may be performed without any considerable wear and tear on the grinding parts, if the iron grains to be ground are quite low in carbon and, thus, are similar in softness to such metals as for example lead or aluminium.

It also is clear, that iron of this nature has a rather low mechanical strength, which is a disadvantage, if it is desired to produce objects, which must possess a relatively high strength and such qualities as those of a high grade steel.

It is, however, possible to obtain the desired strength and ability to harden, if, after the pulverizing of the decarburized iron such a quantity of carbon is introduced into the iron particles as is required for producing strong steel objects by compressing and heating. Such carburizing may suitably be attained by heating the powder in a carbon containing atmosphere, for example in CO-gas, acetylene, illuminating gas, natural gas or in a mixture of gases such as illuminating gas + $H_3N$, methane and so forth, whereby a cementation of the minute particles is effected by the carbon penetrating into the metal. This is facilitated by the fact, that the grains are more or less porous after the previous removal of some 4% C during the decarburizing process.

The carburizing takes place quite rapidly because of the smallness of the particles and it may be accelerated by using a sufficiently high temperature, at least some 700° C., and by using a suitable carburizing means, which may also consist of a mixture of $CO + CO_2$ gases in such proportions that the iron particles are carburized but not materially oxidized on their surfaces. The carburizing process may also be accelerated by keeping the charge in lively motion, for example by placing it in a rotating tubular furnace, which may be heated internally or on the outside, for example by gases or electrically. The rotation also facilitates producing a homogeneous carburizing everywhere in the charge under treatment. One may cause the powder to pass along a rotating, somewhat inclined furnace or retort and discharge it at an elevated temperature of about 900 to 1200° C. so as to be able to form it to objects having more or less steel like qualities. It is possible also to use other types of furnaces, such as the well known Herreshofs pyrite roasting furnaces for carburizing the soft iron particles. A convenient way of heating the charge consists in passing highly preheated gases, such as mentioned here above, through the interior of the container or furnace that is used for the carburizing.

It clearly is possible in a similar way to produce objects of carburizable ferroalloys and to mix the carburized fine powder with one or more fine powders of other metals and alloys. By carburizing the fine iron powder as here described a simultaneous reduction of oxides, which may have been formed superficially on the particles, is obtained. The resulting objects thereby become much stronger. The process of carburizing, thus, produces not only a reduction of oxides in the charge but also in addition to that a carburizing of the material so as to produce by powder metallurgical methods solid objects containing up to 1 to 1.5% of C and more.

It is possible also, if desired, to classify the material in certain grain sizes for example, by screening or sifting, both before and after the decarburizing or carburizing operations.

As an example of how to work along the lines given above it may be mentioned that it has been possible in one hour to increase the carbon of an iron powder from 0.05% C to 0.40% C by heating the particles at a temperature of 900° C. in a rotating, tubular, externally heated furnace, through which a gas mixture comprising 3.8% $CO_2$, 0.6% $O_2$, 93.2% CO and 2.4% $N_2$. It was found that by continuing the heating for two hours more under the same conditions the carbon was increased only to 0.45%, which indicates that the carburizing was probably completed in a much shorter time than one hour, even at that temperature. I do not want to limit myself to the use of any particular kind of furnaces for carburizing soft particles of iron and for decarburizing the high carbon iron particles. Various changes and modifications may be made in the method as above described without departing from the spirit of my invention, the scope of which is to be understood as embracing all that may fall within the purview of the appended claims.

I claim:

1. The method of producing fine ferrous metal powder capable of producing articles having the high physical properties of steel when subjected to powder metallurgical steps of compression and heating, which includes the steps of preparing in subdivided form a high carbon content ferrous metal material, decarburizing the subdivided material to produce a low carbon content soft ferrous material, mechanically disintegrating the soft material to produce fine powder of the size suitable for subsequent powder metallurgical operations and thereafter carburizing the powder by subjecting the same to the action of a carburizing gaseous atmosphere at high temperature but below that which would fuse the powder.

2. The method set forth in claim 1, in which the carburizing step is effected by an atmosphere containing carbonaceous gases such as CO, $CO_2$, illuminating or natural gas, methane or acetylene at a temperature of at least the order of 700° C.

3. The method set forth in claim 1, in which the subdivided material is prepared by disintegrating liquid iron having the high carbon content characteristic of pig iron.

4. The method set forth in claim 1, in which the subdivided material is decarburized to a carbon content within a range of which the upper limit is of the order of 0.25% and the decarburized material is disintegrated by a mechanical milling operation to a fineness of the order of 60 mesh or less.

IVAR RENNERFELT.